United States Patent
Hansen

(10) Patent No.: US 7,641,994 B2
(45) Date of Patent: Jan. 5, 2010

(54) FUEL PROCESSING METHOD AND SYSTEM

(75) Inventor: John Bøgild Hansen, Copenhagen Ø (DK)

(73) Assignee: Haldor Topsoe A/S, Lyngby (DK)

( * ) Notice: Subject to any disclaimer, the term of this patent is extended or adjusted under 35 U.S.C. 154(b) by 836 days.

(21) Appl. No.: 11/143,708

(22) Filed: Jun. 3, 2005

(65) Prior Publication Data

US 2005/0271912 A1 Dec. 8, 2005

(30) Foreign Application Priority Data

Jun. 4, 2004 (DK) ................................. 2004 00879

(51) Int. Cl.
*H01M 5/00* (2006.01)

(52) U.S. Cl. ............................. 429/17; 429/13; 429/19; 48/197 R

(58) Field of Classification Search ................... 429/17, 429/12, 13; 48/197 R
See application file for complete search history.

(56) References Cited

U.S. PATENT DOCUMENTS 4,130,575 A * 12/1978 Jorn ........................... 518/705

(Continued)

FOREIGN PATENT DOCUMENTS

| DE | 101 43 656 A1 | 5/2003 |
| WO | WO 02/067351 * | 8/2002 |
| WO | WO 03/063276 | 7/2003 |
| WO | WO 2004/021496 A1 | 3/2004 |

OTHER PUBLICATIONS

J. R. Rostrup-Nielsen "Catalytic Steam Reforming", *Catalysis—Science and Technology*, vol. 5, 1984.

(Continued)

*Primary Examiner*—Patrick Ryan
*Assistant Examiner*—Julian Mercado
(74) *Attorney, Agent, or Firm*—Dickstein Shapiro LLP

(57) ABSTRACT

A fuel processing method for a solid oxide fuel cell stack comprising the steps of:
(a) supplying a feed stream comprising methanol and/or dimethyl ether to a methanation reactor containing catalytic material for the methanation of methanol and/or dimethyl ether;
(b) processing the feed stream in the methanation reactor under adiabatic conditions to produce an effluent fuel comprising methane;
(c) transferring the effluent fuel comprising methane to the anode of a solid oxide fuel cell stack comprising at least one solid oxide fuel cell;
(d) providing the cathode of the solid oxide fuel cell stack with an oxygen-containing gas; and
(e) converting the fuel comprising methane and the oxygen-containing gas into electricity in the solid oxide fuel cell stack.

11 Claims, 3 Drawing Sheets

U.S. PATENT DOCUMENTS

| | | | |
|---|---|---|---|
| 4,298,694 | A | 11/1981 | Skov et al. |
| 5,017,719 | A * | 5/1991 | Kruse et al. ............... 560/106 |
| 5,595,833 | A * | 1/1997 | Gardner et al. ............. 429/19 |
| 7,452,619 | B2 * | 11/2008 | Ahmed ..................... 429/17 |

OTHER PUBLICATIONS

H. G. Düsterwald, et al., "Methanol Stem-Reforming in a Catalytic Fixed Bed Reactor", *Chem. Eng. Technolqy*, 1997; pp. 617-623.

M. Dokiya et al., "Partial Oxidation Reforing of Dry Diesel Oil, Dimethyl-Ether and Methane Using SOFC," Solid Oxide Fuel Cells VIII, *The Electrochemical Society*, vol. 2003-07, pp. 1260-1265.

A. Tatemi, et al., "Power Generating Property of Direct Dimethyl Ether SOFC Using $L_aG_aO_3$-Based Perovskite Electrolyte", *Electrochemical Society*, vol. 2003-07, pp. 1266-1275.

K. Sasaki et al., "Equilibria in Fuel Cell Gases", *Electrochemical Society*, vol. 2003-07, pp. 1225-1239.

G. J. Saunders et al., "Formulating Liquid Hydrocarbon Fuels for SOFCs", Journal of Power Sources, 2004.

* cited by examiner

FUEL PROCESSING METHOD AND SYSTEM

The invention relates to a method for processing a fuel comprising an oxygen-containing hydrocarbon compound for use in a solid oxide fuel cell. In particular, the invention relates to the processing of methanol and/or dimethyl ether as fuels for solid oxide fuel cells and a system for carrying out the fuel processing method.

BACKGROUND OF THE INVENTION

Methanol and dimethyl ether (DME) are known for use as fuels for solid oxide fuel cells (SOFC). They could be attractive fuels for use in SOFC combined heat and power plants, for instance those plants intended for use as auxiliary power units for marine applications. Potentially the fuel processing steps in such a plant could be very simple ultimately being only evaporation of the methanol or DME and injection into the anode chamber of the SOFC.

This approach would, however, lead to a number of problems and disadvantages:

Saunders, G. J. et al. (Formulating liquid hydrocarbon fuels for SOFCs, Pages 23-26, from Journal of Power Sources Volume 131, Issues 1-2, Pages 1-367 (14 May 2004)) mentioned that dry methanol was prone to form carbon at conditions prevailing in the anode chamber of the SOFC with the most active Ni-cermets as anode material. The results of Saunders et al. showed that only two liquids, methanol and methanoic acid could be injected directly onto nickel cermet anodes without serious carbon blockage. Even then, small amounts of carbon deposition were revealed which could be prevented by adding low amounts of air or water to the fuel.

Carbon formation in a SOFC plant can take place by the following reversible reactions:

$$CH_4 \leftrightarrow C+2H_2 \ (-\Delta H_{298}=-74.9 \text{ kJ/mol}) \quad [1]$$

$$2CO \leftrightarrow C+CO_2 \ (-\Delta H_{298}=172.4 \text{ kJ/mol}) \quad [2]$$

Reaction [2] is known as the Boudouard reaction. Both methanol and DME can decompose to form CO according to reactions [3] and [4]:

$$CH_3OH \leftrightarrow CO+2H_2 \ (-\Delta H_{298}=-90.7 \text{ kJ/mol}) \quad [3]$$

$$CH_3OCH_3 \leftrightarrow CH_4+CO+H_2 \ (-\Delta H_{298}=1.3 \text{ kJ/mol}) \quad [4]$$

As CO is quite reactive, it is important to know the temperature and gas composition ranges, where reaction [2] does not occur. This can be studied using "the principle of the equilibrated gas" assuming both methanation/steam reforming (reaction [5]) and the shift reaction (reaction [6]) to be in equilibrium, as further described by Nielsen, J. R. (Catalytic Steam Reforming, Springer Verlag, Berlin 1984).

$$CH_4+2H_2O \leftrightarrow CO_2+4H_2 \ (-\Delta H_{298}=-165.0 \text{ kJ/mol}) \quad [5]$$

$$CO+H_2O \leftrightarrow CO_2+H_2 \ (-\Delta H_{298}=41.2 \text{ kJ/mol}) \quad [6]$$

Sasaki, K. and Teraoka, Y. (Equilibria in Fuel Cell Gases Pages 1225-1239 from Solid Oxide Fuel Cells VIII (SOFC VIII) Proceedings Volume 2003-07) have studied the amount of water needed to avoid carbon formation.

The direct use of DME in SOFCs has also been reported in the literature by Dokiya, M. et al. (Partial Oxidation Reforming of Dry Diesel Oil, Dimethyl-Ether and Methane using SOFC, pages 1260-1265, from Solid Oxide Fuel Cells VIII (SOFC VIII) Proceedings Volume 2003-07, The Electrochemical Society) and by Tatemi, A. et al. (Power Generating Property of Direct Dimethyl Ether SOFC using LaGaO₃ based Perovskite Electrolyte, pages 1266-1275 from Solid Oxide Fuel Cells VIII (SOFC VIII) Proceedings Volume 2003-07, The Electrochemical Society). One disadvantage was that the open circuit voltages obtained were considerably lower than those obtained using hydrogen as fuel for the SOFC. It was, however, mentioned that only minor amounts of carbon were observed in the short term test stated. There was no mention of the means used to preheat DME to anode operating temperatures in excess of 600° C.

From our knowledge, in an industrial facility such preheat would have to take place in an in/out heat exchanger, which most cost effectively and conveniently would be made of steel. Such heat exchangers would be very prone to carbon formation and metal dusting, if dry methanol or DME were used as feed for the SOFC.

A further disadvantage of using methanol or DME compared to using methane is related to the heat of reactions when steam reforming these fuels. Steam reforming of methane is given in equation 5 and the reforming reactions for methanol and DME are given in equations 7 and 8, respectively:

$$CH_4+2H_2O \leftrightarrow CO_2+4H_2 \ (-\Delta H_{1023}=-191.4 \text{ kJ/mol}) \quad [5]$$

$$CH_3OH+H_2O \leftrightarrow CO_2+3H_2 \ (-\Delta H_{1023}=-70.3 \text{ kJ/mol}) \quad [7]$$

$$CH_3OCH_3+3H_2O \leftrightarrow 2CO_2+6H_2 \ (-\Delta H_{1023}=-160.0 \text{ kJ/mol}) \quad [8]$$

Reforming of the fuel in the anode chamber (internal reforming) helps to cool the stack due to the endothermal nature of the reforming process. However, the heat of reactions for methanol and DME reforming are much less endothermic than methane steam reforming, therefore the cooling of the stack provided by steam reforming of methanol or DME is less effective.

The fuel processing method of the invention describes a process lay-out where all the above problems are overcome by adiabatically converting methanol or DME into a mixture of methane, CO, CO₂ and water.

It is an objective of the invention to provide a fuel processing method for solid oxide fuel cells, whereby the fuels methanol and DME are adiabatically converted to a mixture of methane, CO, CO₂ and water before conversion in a solid oxide fuel cell.

SUMMARY OF THE INVENTION

The invention therefore provides a fuel processing method for a solid oxide fuel cell stack comprising the steps of:

(a) supplying a feed stream comprising methanol and/or dimethyl ether to a methanation reactor containing catalytic material for the methanation of methanol and/or dimethyl ether;

(b) processing the feed stream in the methanation reactor under adiabatic conditions to produce an effluent fuel comprising methane;

(c) transferring the effluent fuel comprising methane to the anode of a solid oxide fuel cell stack comprising at least one solid oxide fuel cell;

(d) providing the cathode of the solid oxide fuel cell stack with an oxygen-containing gas;

(e) converting the fuel comprising methane and the oxygen-containing gas into electricity in the solid oxide fuel cell stack.

The invention also provides a fuel processing system for use in the fuel processing method comprising a methanation reactor comprising catalytic material for methanation of methanol and/or dimethyl ether, and a solid oxide fuel cell stack comprising at least one solid oxide fuel cell, the solid oxide fuel cell stack being placed down stream and in series with the methanation reactor.

DETAILED DESCRIPTION OF THE INVENTION

In the fuel processing method of the invention, methanol and/or DME are adiabatically converted into a mixture of methane, carbon monoxide and carbon dioxide and water. In this way part of the chemical energy contained in the methanol or DME containing feed stream to the methanation reactor is converted to a temperature increase across the methanation reactor. This eliminates the need for the heat exchanger which is usually required to heat the SOFC fuel to the temperature required at the anode inlet. In addition, methanol and/or dimethyl ether are converted to methane, which is much less prone to carbon lay down than carbon monoxide, which could be formed from the feedstock.

The ratio between oxygen and carbon (O/C ratio) in the methanation reactions is very important because this ratio gives an indication of the potential for carbon deposition. Methanol and DME decompose via reactions [3] and [4] to form carbon monoxide, which in turn decomposes to form carbon via the Boudouard reaction [2]. The O/C ratio for methanol is 1, whereas it is 0.5 for DME, and the variation in these ratios is dependent on the temperature and to some extent on the type of catalyst used. Generally the O/C ratio has, at a particular temperature, a minimum value above which carbon formation is avoided. In the fuel processing system of the invention, the O/C ratio is increased by providing the process with extra oxygen. This is done by transporting oxygen from the cathode air via the fuel cell electrolyte to the anode off gas. The anode off gas is then recycled to the anode inlet via the ejector and the methanation reactor. The O/C ratio can also be increased by adding water in substantial amounts to the system.

At the same time the chemical energy converted into latent heat in the methanation reactor does not have to be removed by excess cathode air in the SOFC thus increasing overall electric efficiency of the system.

Figure 1:
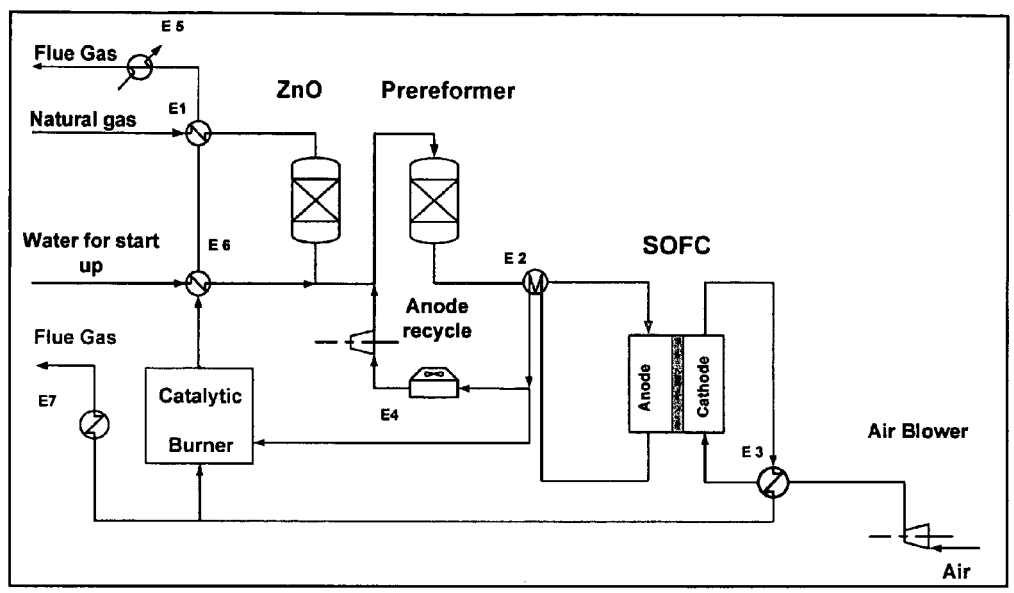
FIG. 1 is a schematic diagram of a conventional fuel processing system based on methane.

FIG. 1 is a schematic diagram of a conventional fuel processing system based on methane. Methane in the form of natural gas is preheated in heat exchanger E1 and then desulphurised in a hydrodesulphurisation unit by hot zinc oxide at 400° C. followed by prereforming of the higher hydrocarbons present in the natural gas in a prereformer. This eliminates the risk of formation of unsaturated compounds at elevated temperatures by dehydrogenation of these higher hydrocarbons. These unsaturated compounds (mainly olefins) are prone to form carbon when heated to the required stack inlet temperature. The water (and $CO_2$) needed for prereforming is provided by a partial recycle of the anode gas by means of a blower with intermediate cooling in heat exchanger E2.

The effluent from the prereformer includes methane and is preheated to the inlet temperature of the anode stack by heat exchange with recycle anode off gas in heat exchanger E2 and thereafter transferred to the anode. Reforming of methane takes place in the anode chamber according to equation 5 and as this reaction is endothermic cooling of the stack occurs.

Compressed air is transferred to the cathode. The stack is kept adiabatic by means of an excess of cathode air, which is preheated in heat exchanger E3 by heat exchange with cathode off gas. The cathode air also provides cooling of the stack.

The off gas from the anode, which is not recycled to the prereformer and the off gas from the cathode, are finally burnt in a catalytic burner. The waste heat in the flue gas from the catalytic burner supplies heat for conversion of water to steam in heat exchanger E6 during start-up for natural gas preheating in heat exchanger E1 and heat for space heating or other purposes.

All of the components of this lay-out are known for use in fuel processing of natural gas with the exception of the SOFC stack itself and to some degree the hot anode recycle blower.

Replacing natural gas by methanol or DME in a conventional process layout of this nature would reduce the amount of cooling of the stack obtainable from the endothermic reforming reactions (internal reforming) of methanol or DME. Further cooling for reducing the temperature of the stack would therefore be required via the cathode air in addition to the amount already being provided. Subsequently, heat exchanger E3 would need to be considerably larger. The loss of electrical energy in the air compression step would also increase.

Figure 2:
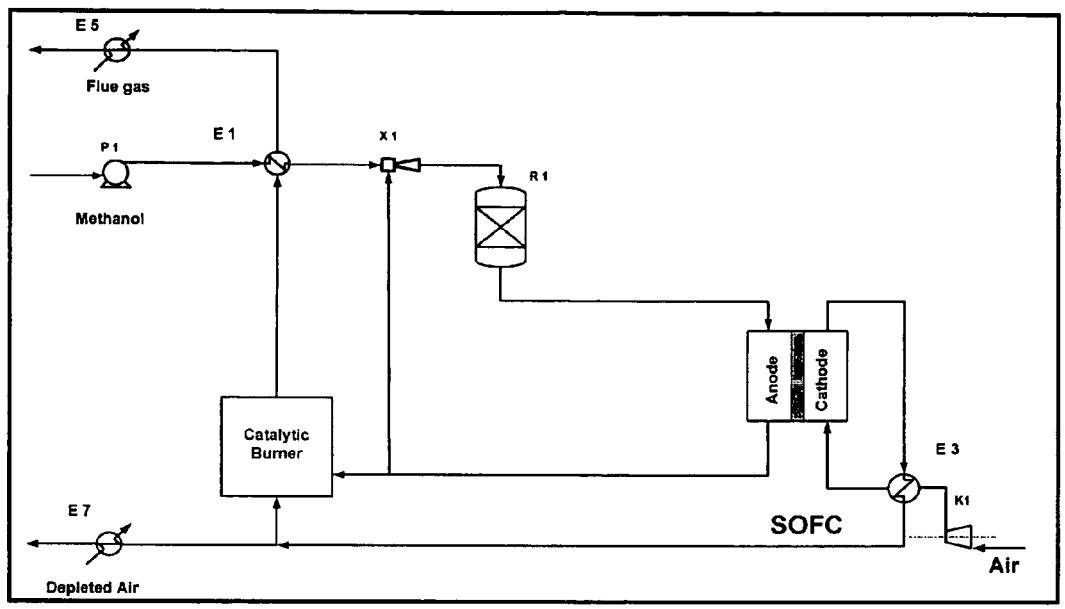
FIG. 2 is a schematic diagram of a fuel processing system based on methanol.

FIG. 2 is a schematic diagram of a fuel processing system based on methanol and illustrating an embodiment of the invention. The various processing steps are equally applicable to a fuel processing system based on DME. Methanol is compressed by means of the pump P1 and thereafter evaporated in heat exchanger E1 by means of waste heat in the flue gas from a catalytic burner. The gaseous methanol leaving the heat exchanger E1 acts as the motive force in ejector X1, after which it is transferred to a methanation reactor R1. The methanation reactor R1 can have an inlet temperature of for instance 300° C. and an outlet temperature of for instance 540° C. Off gas containing $H_2$, $H_2O$, CO, $CO_2$ and $CH_4$ from the solid oxide fuel cell anode is partially recycled to the methanation reactor R1 via the ejector X1. The methanation reactor R1 is loaded with catalyst active for methanol decomposition and methanation. The methanation reactions for methanol and DME are as follows:

  [3]

  [4]

  [9]

  [10]

In the methanation reactor methanol is converted to a mixture of $CH_4$, $H_2$, $H_2O$, CO and $CO_2$ and the effluent from the methanation reactor R1 is transferred to the anode of the SOFC stack. The anode inlet temperature is at least 400° C., preferably at least 500° C.

Compressed air is transferred to the cathode. The stack is kept adiabatic by means of an excess of the compressed cathode air, which is preheated in heat exchanger E3 by heat exchange with cathode off gas to a temperature of typically approximately 650° C.

The remaining anode off gas which is not recycled to the ejector X1 is transferred to the catalytic burner where it is burnt together with cathode off gas. The catalytic burner operates with an exit temperature of typically approximately 700° C. The waste heat in the flue gas from the catalytic burner supplies heat for evaporation of methanol in heat exchanger E1.

In an embodiment of the invention 20% of the anode off gas is recycled to ejector X1 and 80% is transferred to the catalytic burner. The 20% anode off gas recycle serves to increase the overall electric efficiency and at the same time give a better flow distribution in the anode chamber(s) due to a higher mass flow. Additionally, the O/C ratio is also increased at the inlet to the methanation reactor R1.

In another embodiment of the invention there is no recycle of anode off gas. In this case the ejector X1 is not required and dry methanol is thereafter reacted in methanation reactor R1 with a Ni catalyst having very small crystals or a ruthenium or other noble metal based methanation catalyst.

Catalysts applicable in the methanation reactor are conventional catalysts known in the art to be active in both decomposition and methanation of methanol or DME, for instance a nickel or noble metal containing catalyst. A suitable noble metal containing catalyst is for instance a ruthenium containing catalyst.

In another embodiment of the invention a catalyst active in methanol decomposition and methanol reforming is installed in the methanation reactor upstream a catalyst active in methanation of methanol.

Figure 3:
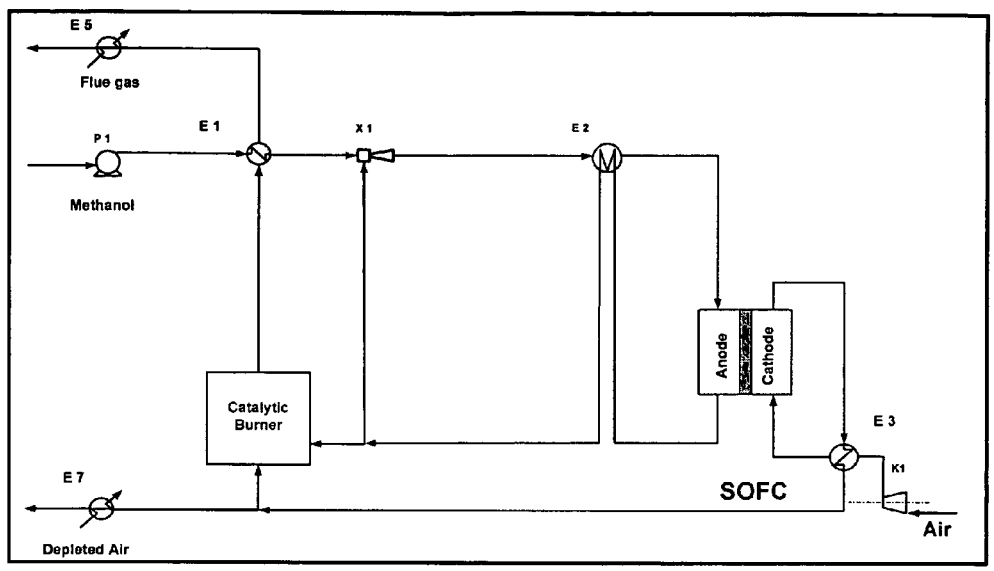
FIG. 3 is a schematic diagram of a comparative fuel processing system based on methanol.

FIG. 3 is a schematic diagram of a comparative fuel processing system where the methanation reactor has been omitted from the process shown in FIG. 2 and the anode off gas recycle maintained. In this layout it is necessary to preheat the inlet gas to the anode in heat exchanger E2 as the temperature of the inlet gas to the anode would otherwise become too low. Heat exchanger E2 is prone to carbon lay down when the fuel processing system is operated with an anode off gas recycle percent of only 20% corresponding to an O/C ratio similar to that of the fuel processing system of the invention shown in FIG. 2.

A comparison of efficiency and duty for the heat exchangers E1 and E2 and the work for air compressor E3 in the fuel processing systems of FIGS. 1-3 have been made. The main results are summarised in Table 1.

TABLE 1

|  | Conventional System (FIG. 1) | System of Invention (FIG. 2) | Methanation step omitted (FIG. 3) |
| --- | --- | --- | --- |
| Electric efficiency (%) | 55.5 | 51.6 | 50.6 |
| Total Efficiency (%) | 83.6 | 84.6 | 82.1 |
| Feed flow (Nm³/h – kg/h) | 40.8 | 87.6 | 89.3 |
| E 1 (kW) | 9.8 | 31.6 | 29.9 |
| E 2 (kW) | 23.4 | — | 30.8 |
| E 3 (kW) | 557.0 | 568.2 | 692.8 |
| Air compressor (kW) | 29.6 | 24.5 | 29.9 |

There are several advantages of converting methanol or DME to methane before further processing in the fuel cell stack. The potential for the problems associated with carbon formation are reduced. The heat exchanger (E2) for heating up the gas to the temperature required at the inlet to the anode is not necessary. The electric efficiency is increased and the combined heat exchanger duties and air compressor work are reduced.

An investment in a methanol methanation reactor of the same size as the prereformer in the conventional system shown in FIG. 1 is required. However, an effective catalyst could lead to a reduction of the volume of the reactor required also because the methanol is free of sulphur, which is a strong poison for catalysts.

Similar benefits are obtained when using DME as feedstock for the fuel processing method. Since DME is normally delivered under pressure (5.9 bar g at ambient conditions) it is thus a liquid fuel and the fuel pump P1 shown in FIGS. 2 and 3 can be omitted. This is an advantage compared to using methanol.

What is claimed is:

1. A fuel processing method for a solid oxide fuel cell stack comprising the steps of:
   (a) supplying a feed stream comprising methanol and/or dimethyl ether to a methanation reactor containing catalytic material for the methanation of methanol and/or dimethyl ether;
   (b) processing the feed stream in the methanation reactor under adiabatic conditions to produce an effluent fuel comprising methane;
   (c) transferring the effluent fuel comprising methane to the anode of a solid oxide fuel cell stack comprising at least one solid oxide fuel cell;
   (d) providing the cathode of the solid oxide fuel cell stack with an oxygen-containing gas; and
   (e) converting the fuel comprising methane and the oxygen-containing gas into electricity in the solid oxide fuel cell stack.

2. Method according to claim 1, wherein the feed stream comprising methanol is vaporised before being supplied to the methanation reactor.

3. Method according to claim 2, wherein an off gas produced at the anode of the solid oxide fuel cell stack is partially recycled to an ejector placed upstream the methanation reactor.

4. Method according to claim 1, wherein an anode off gas produced at the anode of the solid oxide fuel cell stack is partially recycled to an ejector placed upstream the methanation reactor.

5. Method according to claim 4, wherein 20% of the anode off gas is recycled to the ejector.

6. Method according to claim 1, wherein the catalytic material comprises a catalyst active in decomposition of methanol and/or dimethyl ether.

7. Method according to claim 6, wherein the catalytic material is a nickel or ruthenium or other noble metal containing catalyst.

8. Method according to claim 1, wherein the catalytic material is a nickel or ruthenium or other noble metal containing catalyst.

9. Fuel processing system for use in the fuel processing method of claim 1 comprising a methanation reactor comprising catalytic material for methanation of methanol and/or dimethyl ether and a solid oxide fuel cell stack comprising at least one solid oxide fuel cell, the solid oxide fuel cell stack being placed down stream and in series with the methanation reactor.

10. System according to claim 9 comprising an ejector upstream and in series with the methanation reactor.

11. System according to claim 10 comprising recycling means for transferring off gas produced at the anode of the solid oxide fuel cell stack to the ejector.

* * * * *

UNITED STATES PATENT AND TRADEMARK OFFICE
CERTIFICATE OF CORRECTION

PATENT NO. : 7,641,994 B2  Page 1 of 1
APPLICATION NO. : 11/143708
DATED : January 5, 2010
INVENTOR(S) : John Bøgild Hansen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Twenty-first Day of December, 2010

David J. Kappos
*Director of the United States Patent and Trademark Office*